United States Patent
Yu et al.

(10) Patent No.: US 9,426,695 B2
(45) Date of Patent: Aug. 23, 2016

(54) METHOD AND DEVICE FOR MANAGING INTERFERENCE

(71) Applicant: Huawei Technologies Co., LTD., Shenzhen (CN)

(72) Inventors: Yinghui Yu, Shenzhen (CN); Xin Xiong, Shenzhen (CN); Weihua Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 180 days.

(21) Appl. No.: 14/286,430

(22) Filed: May 23, 2014

(65) Prior Publication Data

US 2014/0256344 A1    Sep. 11, 2014

Related U.S. Application Data

(63) Continuation of application No. PCT/CN2012/085216, filed on Nov. 24, 2012.

(30) Foreign Application Priority Data

Nov. 29, 2011   (CN) .......................... 2011 1 0387429

(51) Int. Cl.
*H04W 72/00*   (2009.01)
*H04W 28/16*   (2009.01)

(52) U.S. Cl.
CPC ..................... *H04W 28/16* (2013.01)

(58) Field of Classification Search
CPC ................................................... H04W 28/16
USPC ......................................... 455/452.2; 370/331
See application file for complete search history.

(56) References Cited

U.S. PATENT DOCUMENTS

| | | | |
|---|---|---|---|
| 2010/0165955 A1 | 7/2010 | Park et al. | |
| 2010/0317355 A1 | 12/2010 | Zangi et al. | |

FOREIGN PATENT DOCUMENTS

| | | |
|---|---|---|
| CN | 101222759 A | 7/2008 |
| CN | 101400130 A | 4/2009 |
| CN | 101420746 A | 4/2009 |
| CN | 101616423 A | 12/2009 |
| CN | 102088783 A | 6/2011 |
| CN | 102804660 A | 11/2012 |
| EP | 2136483 A1 | 12/2009 |
| EP | 2205033 A2 | 7/2010 |
| WO | WO 2010/143148 A1 | 12/2010 |

*Primary Examiner* — Charles Shedrick
(74) *Attorney, Agent, or Firm* — Brinks Gilson & Lione

(57) ABSTRACT

A method includes: reporting a scheduling parameter to a centralized control node, where the scheduling parameter includes information of a cell which interferes a serving cell of a user equipment and/or load information of the serving cell of the user equipment, the information of the cell which interferes the serving cell of the user equipment is generated from a measured result reported by the user equipment, and the measured result is obtained by performing a measurement on a cell adjacent to the serving cell of the user equipment; receiving scheduling control information sent by the centralized control node, where the scheduling control information is determined according to the scheduling parameter; and scheduling resources according to the scheduling control information.

22 Claims, 3 Drawing Sheets

METHOD AND DEVICE FOR MANAGING INTERFERENCE

CROSS-REFERENCE TO RELATED APPLICATIONS

This application is a continuation of International Application No. PCT/CN2012/085216, filed on Nov. 24, 2012, which claims priority to Chinese Patent Application No. 201110387429.7 filed on Nov. 29, 2011, both of which are hereby incorporated by reference in their entireties.

FIELD

The present application relates to the technical field of communication, and in particular to a method and device for managing interference.

BACKGROUND

In existing LTE (Long Term Evolution) technology, a static interference coordination method, such as fractional frequency reuse (FFR) and soft frequency reuse (SFR), are often adopted for managing interference. If the load of each cell in a system varies remarkably with time, the static interference coordination method seems to be inflexible. If the interference is in a high load state at edges of the cell and is in a low load state at a center of the cell, the performance of the cell at the edges thereof may not improve obviously with the static interference coordination.

In E-UTRAN (Evolved Universal Terrestrial Radio Access) system, the direct connection interface X2 among eNBs (Evolved Node Bases) has a typical delay ranging from 10 ms to 20 ms. Thus, a semi-static interference coordination method, such as ICIC (inter-cell interference coordination), is adopted for managing interference. ICIC may includes: exchanging load information of the cells between base stations; and coordinating interference by adjusting a frequency resource distribution and power of the subscriber at the center and the edges to improve the performance of the subscriber at the edges. ICIC is an allocated interference control solution. However, the existing ICIC relies on the direct connection interface X2 among base stations.

For example, in LTE-Hi (LTE-High Frequency Hotspot and indoor), because AP (Access Point) does not support X2 interface, the ICIC cannot be applied to LET-Hi. Thereby, ICIC cannot be applied to the communication system, APs in which are not connected via the interface.

SUMMARY

A method and a device for managing interference are provided according to embodiments of the application, by which the interference among stations in LTE-Hi technology may be managed.

A method for managing interference is provided, which includes: reporting a scheduling parameter to a centralized control node, where the scheduling parameter includes information of a cell which interferes a serving cell of UE (User Equipment) and/or load information of the serving cell of the UE, and where the information of the cell which interferes the serving cell of the UE is generated from a measured result reported by the UE, and the measured result is obtained by performing a measurement on a cell adjacent to the serving cell of the UE; receiving scheduling control information sent by the centralized control node, wherein the scheduling control information is determined according to the scheduling parameter; and scheduling resources according to the scheduling control information.

In other aspects, a method for managing interference is provided, which includes: receiving a scheduling parameter reported by at least one AP, where the scheduling parameter includes information of a cell which interferes a serving cell of a UE served by the at least one AP and/or load information of the serving cell of the UE, and where the information of the cell which interferes the serving cell of the UE is generated from a measured result reported by the UE, and the measured result is obtained by performing a measurement on a cell adjacent to the serving cell of the UE; determining scheduling control information according to the scheduling parameter; sending the scheduling control information to the at least one AP, where the at least one AP schedules resources according to the scheduling control information.

In other aspects, a device for managing interference is provided, which includes: a reporting unit adapted to report a scheduling parameter to a centralized control node, where the scheduling parameter includes information of a cell which interferes a serving cell of a UE and/or load information of the serving cell of the UE, and where the information of the cell which interferes the serving cell of the UE is generated from a measured result reported by the UE, and the measured result is obtained by performing a measurement on a cell adjacent to the serving cell of the UE; a first receiving unit adapted to receive scheduling control information sent by the centralized control node, wherein the scheduling control information is determined according to the scheduling parameter reported by the reporting unit; a scheduling unit adapted to schedule resources according to the scheduling control information received by the first receiving unit.

In other aspects, a device for managing interference is provided, which includes a second receiving unit adapted to receive a scheduling parameter reported by at least one AP, where the scheduling parameter includes information of a cell which interferes a serving cell of a UE served by the at least one APs and/or load information of the serving cell of the UE, and where the information of the cell which interferes the serving cell of the UE is generated from a measured result reported by the UE, and the measured result is obtained by performing a measurement on a cell adjacent to the serving cell of the UE; a determining unit adapted to determine scheduling control information according to the scheduling parameter received by the second receiving unit; a sending unit adapted to send the scheduling control information determined by the determining unit to the at least one AP, where the at least one AP schedules resources according to the scheduling control information.

With the method and device for managing interference, in the case that no direct connection interface is provided among APs, a centralized interference control among APs may be implemented according to different loads of APs and different resource requirements at the edges of the cell, and thus the semi-static interference coordination may be realized. It should be understood that besides LET-Hi, the method and device may also applied to the case where no direct connection interface X2 is provided among APs or base stations.

BRIEF DESCRIPTION OF THE DRAWINGS

In order to specify the technical solution according to the embodiments of the application, the drawings in the embodiments and the existing technical solutions may be briefly described. Obviously, the following drawings are only part of the embodiments of the application, and those skilled in the art may obtain other drawings according to these drawings without creative work.

DESCRIPTION OF EMBODIMENTS

Figure 1:
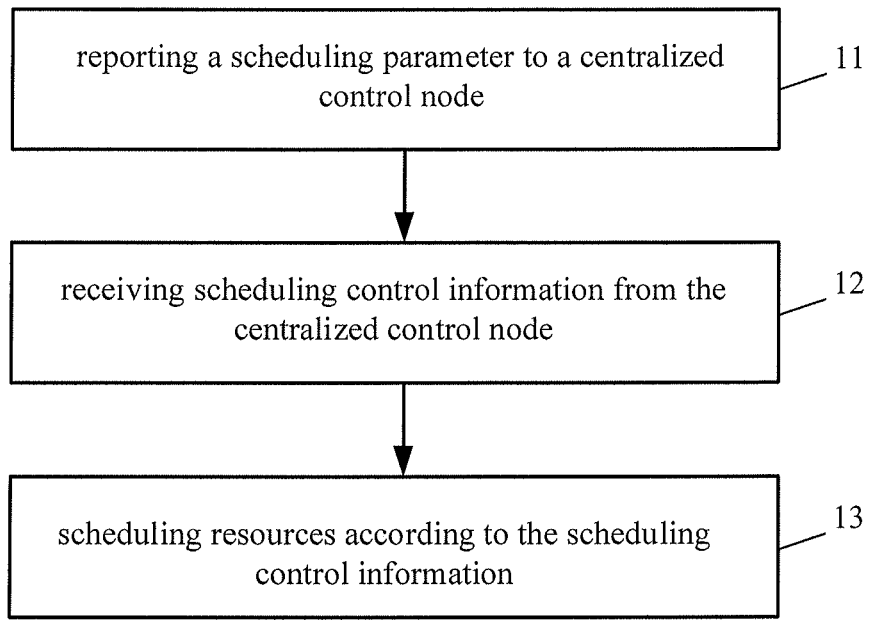
FIG. 1 is a flow chart of a method for managing interference according to an embodiment of the application.

The technical solutions according to the embodiments of the application may be specified below in conjunction with drawings. Obviously, the embodiments are only a part of the embodiments of the application, but not all. Based on the embodiments of the application, other embodiments made by those skilled in the art without creative work may fall into the protection scope of the application.

In this embodiment, a centralized control node may acquire load information of LTE-Hi APs served by the centralized control node and measurement information of neighbor cells. According to the acquired information, the centralized control node may define a frequency resource block at edges of a serving cell of the LTE-Hi AP and a transmitting power thereof.

In this embodiment, the centralized control node may be a LTE-Hi GW (Gateway), a macro base station or other network nodes excepting the LTE-Hi APs.

In conjunction with FIG. 1, a method for managing interference is described below according to an embodiment of the application by taking an LTE-Hi GW and an LTE-Hi AP as an example.

In block 11, a serving LTE-Hi AP reports a scheduling parameter to a centralized control node. The scheduling parameter includes information of a cell which interferes a serving cell of a UE served by the serving LTE-Hi AP and/or load information of the serving cell of the UE served by the serving LTE-Hi AR The information of the cell which interferes the serving cell of the UE is generated from a measured result reported by the UE, and the measured result is obtained by performing a measurement on a neighbor cell.

Generally, if no cell is adjacent to the serving cell of the UE served by the serving LTE-Hi AP, the scheduling parameters may not include the information of the cell which interferes the serving cell of the UE served by the serving LTE-Hi AP. If the serving LTE-Hi AP does not serve any UE, the scheduling parameters may not include the load information of the serving cell of the UE served by the serving LTE-Hi AR If any cell may interfere the serving cell of the UE served by the serving LTE-Hi AP, and the serving LTE-Hi AP has a resource requirement at the edges of the serving cell of the UE, the scheduling parameter may include the information of the cell which interferes the serving cell of the UE served by the serving LTE-Hi AP and the load information of the serving cell of the UE served by the serving LTE-Hi AP.

In one embodiment, the information of the cell which interferes the serving cell of the UE served by the serving LTE-Hi AP includes spectrum information and identification information of the cell which interferes the serving cell of the UE served by the serving LTE-Hi AR The load information of the serving cell of the UE served by the serving LTE-Hi AP includes spectrum information of the serving cell and time-frequency resource requirement information of the serving cell edge. For example, the spectrum information of the serving cell includes a bandwidth and a frequency of the serving cell. For example, the time-frequency resource requirement information of the serving cell edge includes information of dedicated time-frequency resource block required at the serving cell edge. The information of dedicated time-frequency resource block may be information of a time-frequency resource block for GBR (Guaranteed Bit Rate) service, information of a time-frequency resource block for non-GBR (non-Guaranteed Bit Rate) service, or information of a the time-frequency resource block for PBR (Prioritized Bit Rate) of non-GBR services.

In addition, the UE may report to the serving LTE-Hi AP the measured result for the cell adjacent to the serving cell of the UE. The serving LTE-Hi AP may generate from the measuring result the information of the cell which interferes the serving cell of the UE. For example, to reflect the interference, a measuring parameter may be preferably configured to be RSRQ (Reference Signal Receiving Quality). The measuring parameter may also be configured to be RSRP to reflect information related to the relative position of cells.

Besides the information of the cells which interferes the serving cell of the UE and the load information of the serving cell of UE, the scheduling parameter may further include a time period of the interference and/or user satisfaction feedback information from the user equipment at the serving cell edge. For example, LTE-Hi AP may generate the scheduling control information based on the time period of interference. No resource at the serving cell edge is allocated to a LTE-Hi AP or LTE-Hi GW in sleep. For example, the user satisfaction feedback information of the serving cell edge may reflect whether the user at the serving cell edge is satisfied with the allocated resource. For the LTE-Hi AP which is satisfied by the user at the serving cell edge, the LTE-Hi GW may reduce the resource distribution of non-GBR service, in the case that the resource requirement of GBR service and the resource requirement of PRB of non-GBR service are satisfied. For the LTE-Hi AP which is not satisfied by the user at the serving cell edge, the LTE-Hi GW may increase the resource distribution on non-GBR service, in the case that the resource requirement of GBR service and the resource requirement of PRB of non-GBR service are satisfied.

For instance, because the LTE-Hi AP may switch between serving and sleeping state, certain serving LTE-Hi AP may report its time period of interference to LTE-Hi GW. Alternatively, the serving LTE-Hi AP may report the user satisfaction feedback information of the edge of its serving cell to the LTE-Hi GW. The user satisfaction feedback information may be indicated by happy bit (Happy bit) of the existing network.

In block 12, the serving LTE-Hi AP receives scheduling control information sent by the centralized control node, where the scheduling control information is determined according to the scheduling parameter.

According to the information of the cell which interferes the serving cell of the UE served by the serving LTE-Hi AP, the LTE-Hi GW may distribute, among multiple cells which interfere the serving cell, an overlapped resource of the cell which interferes the serving cell.

The time-frequency resource requirement information of the serving cell edge of the UE served by the serving LET-Hi AP reflects a demand of time-frequency resources. The different resource requirements of the serving cell edge reflect the requirement of QoS (Quality of Service) of the resource, such as GBR service, PBR of non-GBR service, or non-GBR service. The LTE-Hi GW may first meet the resource requirement of GBR service, then the resource requirement of PBR of non-GBR service, and last the resource requirement of non-GBR service.

Generally, the centralized control node may determine the scheduling control information according to the received scheduling parameter. Generally, besides the permitted, the scheduling control information may include permissible transmission power information, and may further include the time-frequency resource information allocated to the serving cell edge. For example, the time-frequency resource information allocated to the serving cell edge may include information of dedicated time-frequency resource block allocated to the serving cell edge and/or information of common time-frequency resource block allocated to the serving cell edge. The information of dedicated time-frequency resource block may be for example information of time-frequency resource block for GBR service, information of time-frequency resource block for non-GBR service, or information of time-frequency resource block for PBR of non-GBR service. The at least one AP uses a contention based mechanism to access the common time-frequency resource block.

In block 13, the serving LTE-Hi AP schedules resources according to the scheduling control information.

After receiving the scheduling control information determined by the centralized control node, the serving LTE-Hi AP may schedule resources according to the received scheduling control information.

With the method for managing interference according to the embodiment of the application, in the case that no direct connection interface is provided among APs, the centralized interference control among APs may be implemented according to different loads of APs and different resource requirements at the edge of the cell, thereby implementing the semi-static interference coordination.

Figure 2:
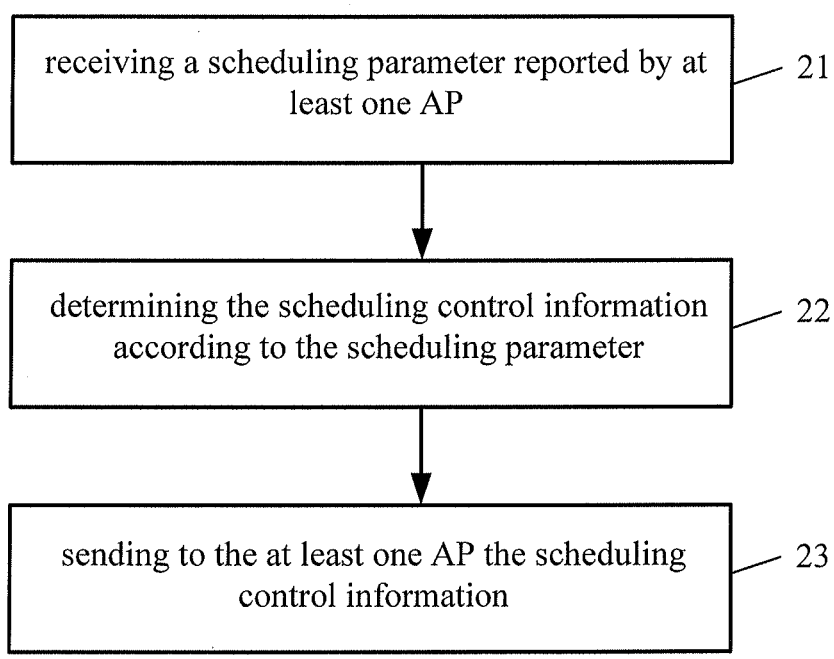
FIG. 2 is a flow chart of a method for managing interference according to another embodiment of the application.

In conjunction with FIG. 2, a method for managing interference according to another embodiment of the application may be described by taking LTE-Hi GW and LTE-Hi AP as an example.

In block 21, an LTE-Hi GW receives a scheduling parameter reported by at least one AP. The scheduling parameter includes information of a cell which interferes a serving cell of each UE served by the AP and/or load information of the serving cell of the UE. The information of the cell which interferes the serving cell of the UE may be generated from a measured result reported by the UE, and the measured result is obtained by performing a measurement on a neighbor cell.

Similarly, the information of the cell which interferes the serving cell of the UE includes spectrum information of the cell which interferes the serving cell of the UE and identification information of the cell which interferes the serving cell of the UE. The load information of the serving cell includes spectrum information of the serving cell and time-frequency resource requirement information of the serving cell edge. For example, the spectrum information of the serving cell includes a bandwidth and a frequency of the serving cell. For example, the time-frequency resource requirement information of the serving cell edge includes information of dedicated time-frequency resource block required at the serving cell edge. The information of dedicated time-frequency resource block required at the serving cell edge includes information of time-frequency resource block for GBR service required at the serving cell edge, information of time-frequency resource block for non-GBR service required at the serving cell edge, or information of time-frequency resource block for Prioritized Bit Rate (PBR) of non-GBR service required at the serving cell edge.

In addition, the scheduling parameter may further include a time period of the interference, user satisfaction feedback information of the serving cell edge, or closing information of the closed AP. If a serving LTE-Hi AP of the LTE-Hi GW is closed, the closed LTE-Hi AP may report the closing information to the LTE-Hi GW, and the LTE-Hi GW may determine scheduling control information for managing interference according to the closing information.

22, the LTE-Hi GW determines the scheduling control information according to the above scheduling parameter.

The scheduling control information includes permissible transmission power information and the time-frequency information allocated to the serving cell edge. The time-frequency resource information allocated to the serving cell edge includes information of dedicated time-frequency resource block allocated to the serving cell edge, i.e., information of time-frequency resource block for GBR service allocated to the serving cell edge, information of time-frequency resource block for non-GBR service allocated to the serving cell edge, or information of time-frequency resource block for PBR of non-GBR service allocated to the serving cell edge.

In one embodiment, if the information of dedicated time-frequency resource block of the time-frequency resource requirement information of the serving cell edge in the scheduling parameter includes the information of time-frequency resource block for GBR service and the information of time-frequency resource block for non-GBR service, the scheduling control information determined by LTE-Hi GW may include the information of time-frequency resource block for GBR service allocated to the serving cell edge, and the information of time-frequency resource block for non-GBR service allocated to the serving cell edge. The LTE-Hi GW may first meet the requirements of the uplink and downlink in GBR service. Furthermore, The LTE-Hi GW may distribute the rest of the time-frequency block to non-GBR service among multiple cells, in the case that the requirement of GBR service is met.

If the information of dedicated time-frequency resource block of the time-frequency requirement information of the serving cell edge in the scheduling parameter includes the information of time-frequency resource block for GBR service and the information of time-frequency resource block for PBR of non-GBR service, the scheduling control information determined by LTE-Hi GW may include the information of time-frequency resource block for GBR service allocated to the serving cell edge, the information of time-frequency resource block for PBR of non-GBR service allocated to the serving cell edge, and information of common time-frequency resource block. The at least one AP use a contention based mechanism to access the common time-frequency resource block to be used. The LTE-Hi GW may first meet the requirement of the uplink and downlink in GBR service and the requirement of PBR of non-GBR services. The at least one AP use a contention based mechanism to access the rest of the time-frequency blocks, in the case that the requirement of GBR service and the requirement of PBR of non-GBR service are met.

In block 23, the LTE-Hi GW sends to the at least one AP the above scheduling control information, and the at least one AP may schedule resources according to the above scheduling control information.

With the method for managing interference according to the embodiment of the application, if no direct connection interface is provided among APs, the centralized interference control among APs may be implemented by the centralized control node according to different loads of APs and different resource requirements at the edge of the cell, thereby implementing the semi-static interference coordination.

The method for managing interference according to an embodiment of the application may be described below in conjunction with the flow chart shown in FIG. 3.

Figure 3:
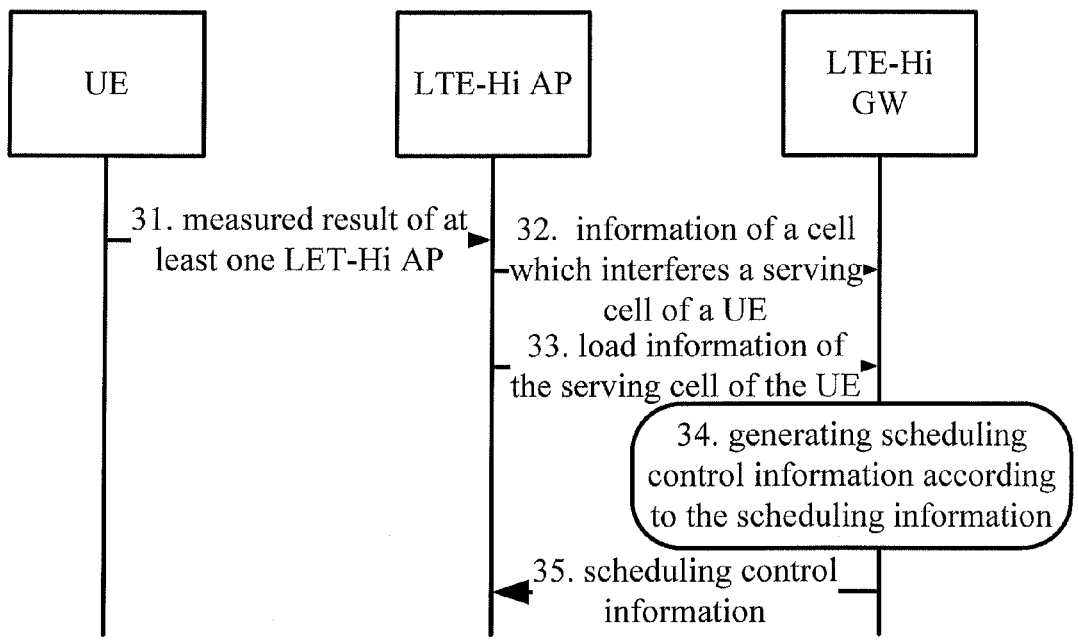
FIG. 3 is a flow chart of a method for managing interference according to a specific embodiment of the application.

In Step 31 in FIG. 3, the UE may report to a serving LTE-Hi AP serving a UE, a measured result of at least one cell adjacent to a serving cell of the UE. The serving LTE-Hi AP may generate, from the measuring result, information of a cell which interferes the serving cell of the UE, such as a list of the cells which interferes the UE.

Then, in Step 32, the serving LTE-Hi AP may report to the LTE-Hi GW the information of the cell which interferes the serving cell of the UE served by the serving LTE-Hi AP, which is generated in Step 31. Thus, the LTE-Hi GW may establish an interference database based on the information of the cell which interferes the serving cell of the UE served by the serving LTE-Hi AP.

Optionally, the serving LTE-Hi AP may report to the LTE-Hi GW, the time period of interference or the experience (such as Happy bit) of the user at the serving cell edge served by the serving LTE-Hi AP.

If the other LTE-Hi APs excepting the serving LTE-Hi AP are closed, the closed LTE-Hi AP needs to report the closing information to the LTE-Hi GW in order that the LTE-Hi GW may implement interference management.

In Step 33, the serving LTE-Hi AP may report to LTE-Hi GW, load information of the serving cell of the UE served by the serving LTE-Hi AP. Particularly, the serving LTE-Hi AP may report to the LTE-Hi GW, spectrum information of the serving cell and time-frequency resource requirement information of the serving cell edge.

For instance, the serving LTE-Hi AP may report to the LTE-Hi GW, a system bandwidth and the work frequency of the LTE-Hi AP as the spectrum information of the serving cell. For the LTE-Hi GW, the system bandwidth may be 40 MHz, 80 MHz or 160 MHz. If the system bandwidth is not more than 40 MHz, the serving LTE-Hi AP may communicate with UE in single carrier mode or in multi-carrier aggregation mode. If the system bandwidth is more than 40 MHz, the serving LTE-Hi AP may communicate with UE in multi-carrier aggregation mode. The LTE-Hi GW may perform the interference management on the main carrier of the serving LTE-Hi AP firstly.

The information of the serving cell, and the spectrum information and identification information of the neighbor cell which interferes the serving cell are shown in Table 1.

TABLE 1 information of the neighbor cell and information of the serving cell

| Cell | Exist or not | Scope | Type of cell and reference | Semantic description |
|---|---|---|---|---|
| information of serving cell information of neighbor cell | | | XXX | XXX corresponds to a relevant protocol content |
| >>ECGI | Yes | | ECGI | |
| >>PCI | Yes | | INTEGER (0 ... 503, ... ) | |
| >>EARFCN | Yes | | XXX | |

In FIG. 1, the information of the serving cell includes the load information of the serving cell. For example, the load information of the serving cell may include the spectrum information and identification information of the serving cell. The cell of the serving cell is the same as the cell of the serving cell of X2 port in an exiting LTE standard (such as TS36.423). The spectrum information of the serving cell includes uplink and downlink frequencies of FDD (Frequency Division Duplexing), uplink and downlink transmission bandwidths of FDD, a frequency of TDD (Time Division Duplexing), a bandwidth of TDD and a configuration of subframes of TDD. The information of the neighbor cell includes the spectrum information and identification information of the neighbor cell. For example, "ECGI" indicates the identification number of the neighbor cell, "PCI" indicates the free port number of the neighbor cell, and "EARFCN" indicates a frequency of the neighbor cell.

In one embodiment, the serving LTE-Hi AP needs to report to the LTE-Hi GW the load information of the AP on each carrier, such as the load information of the serving cell edge of the UE served by the serving LTE-Hi AP. The load information of the serving cell edge of the UE served by the serving LTE-Hi AP refers to the number of PRBs (Physical Resource Blocks) required to be scheduled by the serving LTE-Hi AP at the serving cell edge. The PRB is a time-frequency resource block, for example, a time-frequency resource block having 12 carriers *one TTI (Transmission Time Interval) (ms).

In the case that the LTE-Hi GW schedules all the overlapped time-frequency resource blocks of the cell which interferes the serving cell, the serving LTE-Hi AP may report the contents in Table 2.

TABLE 2 resource requirement 1 reported to the LTE-Hi GW by the serving LTE-Hi AP

| Cell | Exist or not | Scope | Type of cell and reference | Semantic description |
|---|---|---|---|---|
| DL GBR PRB usage | Yes | | INTEGER (0 ... max PRB) | max PRB is the number of PRBs which the LTE-Hi GW can provide for all the cells |
| UL GBR PRB usage | Yes | | INTEGER (0 ... max PRB) | |
| DL non-GBR PRB usage | Yes | | INTEGER (0 ... max PRB) | |
| UL non-GBR PRB usage | Yes | | INTEGER (0 ... max PRB) | |
| DL Total PRB usage | Yes | | INTEGER (0 ... max PRB) | |
| UL Total PRB usage | Yes | | INTEGER (0 ... max PRB) | |

In Table 2, "DL GBR PRB usage" represents a demand of the PRBs for the GBR service in downlink, "UL GBR PRB usage" represents a demand of the PRBs for the GBR service in uplink, "DL non-GBR PRB usage" represents a demand of the PRBs for the non-GBR service in downlink, "UL non-GBR PRB usage" represents a demand of the PRBs for the non-GBR service in uplink, "DL Total PRB usage" represents a demand of all the PRBs in downlink, and "UL Total PRB usage" represents a demand of all the PRBs in uplink.

Referring to Table 2, the serving LTE-Hi AP may report to the LTE-Hi GW information of the number of PRBs required by the GBR service and non-GBR service at the serving cell edge. After receiving the above information reported by the multiple serving LTE-Hi APs, the LTE-Hi GW may further determine a scheduling method 1.

In the case that the LTE-Hi GW only schedules the demand of PBRs of the GBR service and non-GBR service, the serving LTE-Hi AP may report contents in Table 3.

In FIG. 3, "DL GBR PRB usage" represents a demand of the PRBs for the GBR service in downlink, "UL GBR PRB usage" represents a demand of the PRBs for the GBR service in uplink, "DL non-GBR PBR PRB usage" represents a demand of the PRBs for the PBR of the non-GBR service in downlink, "UL non-GBR PBR PRB usage" represents a demand of the PRBs for the PBR of the non-GBR service in uplink, "DL Total PRB usage" represents a demand of all the PRBs in downlink, and "UL Total PRB usage" represents a demand of all the PRBs in uplink.

the multiple serving LTE-Hi APs in Table 2, the LTE-Hi GW may determine the scheduling method 1. In the method 1, the requirement of GBR service in uplink and downlink may be satisfied firstly. On the premise of meeting the requirement of GBR service, the rest of the PRB may be allocated to non-GBR service among different serving cells. The resource multiplexing may be adopted for the resource to be allocated, and be controlled in terms of power. The resource determined to be sent to the serving LTE-Hi AP by LTE-Hi GW is shown in Table 4.

Optionally, according to the time-frequency resource requirement information of the serving cell edge reported by the multiple serving LTE-Hi APs in Table 3, the LTE-Hi GW may determine the scheduling method 2. In the method 2, the LTE-Hi GW may schedule a power multiplexing of the dedicated time-frequency resource block for the PBRs of GBR service and non-GBR service. The serving LTE-Hi APs use a contention based mechanism to access the rest of the resource. In this case, the resource determined to be sent to the serving LTE-Hi AP by the LTE-Hi GW may be shown in FIG. 5.

In the following FIG. 4 and FIG. 5, "DL GBR PRB usage" represents a demand of the PRBs for the GBR service in downlink, "UL GBR PRB usage" represents a demand of the

TABLE 3 resource requirement 2 reported to the LTE-Hi GW by the serving LTE-Hi AP

| Cell | Exist or not | Scope | Type of cell and reference | Semantic description |
|---|---|---|---|---|
| DL GBR PRB usage | Yes | | INTEGER (0 ... max PRB) | max PRB is the number of PRBs which the LTE-Hi GW can provide for all the cells |
| UL GBR PRB usage | Yes | | INTEGER (0 ... max PRB) | |
| DL non-GBR PBR PRB usage | Yes | | INTEGER (0 ... max PRB) | PBR (Prioritized Bit Rate) |
| UL non-GBR PBR PRB usage | Yes | | INTEGER (0 ... max PRB) | |
| DL Total PRB usage | Yes | | INTEGER (0 ... max PRB) | |
| UL Total PRB usage | Yes | | INTEGER (0 ... max PRB) | |

According to Table 3, the serving LTE-Hi AP may report to the LTE-Hi GW information of the number of PRBs required by the PBRs of the GBR service and non-GBR service at the serving cell edge. After receiving the above information reported by the multiple serving LTE-Hi APs, the LTE-Hi GW may further determine a scheduling method 2.

Thus, in Step 34, according to the time-frequency resource requirement information of the serving cell edge reported by PRBs for the GBR service in uplink, "DL non-GBR PBR PRB usage" represents a demand of the PRBs for the PBR of the non-GBR service in downlink, "UL non-GBR PBR PRB usage" represents a demand of the PRBs for the PBR of the non-GBR service in uplink, "DL common PRB usage" represents the common PRB which can be competed for in downlink, and "UL common PRB usage" represents the common PRB which can be competed for in uplink.

TABLE 4 the resource determined to be sent to the serving LTE-Hi AP by the LTE-Hi GW: a scheduling of the dedicated time-frequency resource block (power multiplexing)

| Cell | Exist or not | Scope | Type of cell and reference | Semantic description |
|---|---|---|---|---|
| Identification of cell | | | ECGI/PCI | |
| DL GBR PRB usage | required | | BIT STRING (1 ... max PRB per cell, ....) | 1 represents the allocated resource, and 0 represents the unallocated resource |

TABLE 4-continued the resource determined to be sent to the serving LTE-Hi AP
by the LTE-Hi GW: a scheduling of the dedicated time-frequency
resource block (power multiplexing)

| Cell | Exist or not | Scope | Type of cell and reference | Semantic description |
|---|---|---|---|---|
| DL non-GBR PRB usage | selectable | | BIT STRING (1 ... max PRB per cell, ... ) | 1 represents the allocated resource, and 0 represents the unallocated resource |
| permissible transmission power | selectable | | ( ... max allowed Tx power) | |
| UL GBR PRB usage | required | | BIT STRING (1 ... max PRB per cell, ... ) | 1 represents the allocated resource, and 0 represents the unallocated resource |
| DL non-GBR PRB usage | selectable | | BIT STRING (1 ... max PRB per cell, ... ) | 1 represents the allocated resource, and 0 represents the unallocated resource |
| permissible transmission power | selectable | | ( ... max allowed Tx power) | |

TABLE 5 the resource determined to be sent to the serving LTE-Hi AP
by the LTE-Hi GW: a scheduling of the dedicated time-frequency
resource block (power multiplexing) and a competitive scheduling
of the common time-frequency resource block

| Cell | Exist or not | Scope | Type of cell and reference | Semantic description |
|---|---|---|---|---|
| Identification of cell | | | ECGI/PCI | |
| DL GBR PRB usage | required | | BIT STRING (1 ... max PRB per cell, ... ) | 1 represents the allocated resource, and 0 represents the unallocated resource |
| DL non-GBR PBR usage | selectable | | BIT STRING (1 ... max PRB per cell, ... ) | 1 represents the allocated resource, and 0 represents the unallocated resource |
| permissible transmission power | selectable | | ( ... max allowed Tx power) | |
| UL GBR PRB usage | required | | BIT STRING (1 ... max PRB per cell, ... ) | 1 represents the allocated resource, and 0 represents the unallocated resource |
| DL non-GBR PBR usage | selectable | | BIT STRING (1 ... max PRB per cell, ... ) | 1 represents the allocated resource, and 0 represents the unallocated resource |
| permissible transmission power | selectable | | ( ... max allowed Tx power) | |
| UL common PRB | selectable | | BIT STRING (1 ... max PRB per cell, ... ) | 1 represents the allocated resource, and 0 represents the unallocated resource |
| DL common PRB | selectable | | BIT STRING (1 ... max PRB per cell, ... ) | 1 represents the allocated resource, and 0 represents the unallocated resource |

Figure 4:
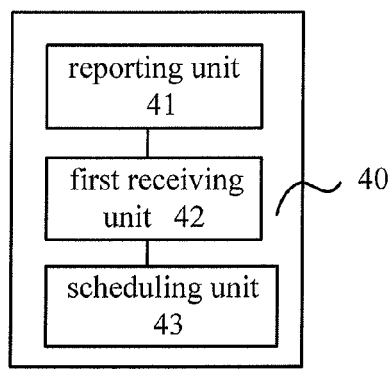
FIG. 4 is a structural schematic view of a device for managing interference according to an embodiment of the application.
Figure 5:
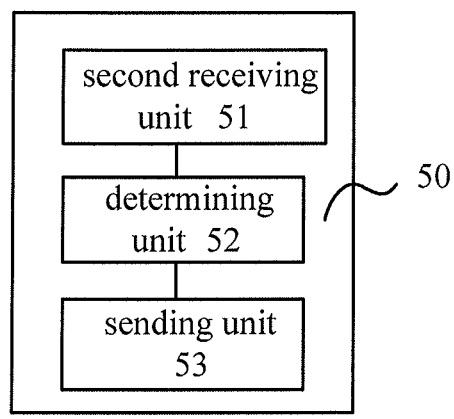
FIG. 5 is a structural schematic view of a device for managing interference according to another embodiment of the application.

Finally, in Step 35, the LTE-Hi GW may distribute the determined resources shown in FIG. 4 and FIG. 5 to the respective serving LTE-Hi APs. The serving LTE-Hi AP may adjust dynamically the resources of the serving cell edge according to the load and user's experience at the serving cell edge. The he adjusted resource is indicated in FIG. 4 and FIG. 5.

Thus, by the method for managing interference according to the embodiment of the application, in the case that no direct connection interface is provided among APs, a centralized control node performs a centralized interference control among APs according to different loads of APs and different resource requirements of the edge of the cell, thereof implementing the semi-static interference coordination.

A device for managing interference according to an embodiment of the application may be described below in conjunction with FIG. 4 and FIG. 5.

As shown in FIG. 4, a device 40 for managing interference includes a reporting unit 41, a first receiving unit 42 and a scheduling unit 42. The reporting unit 41 is adapted to report a scheduling parameter to a centralized control node. The scheduling parameter includes information of a cell which interferes a serving cell of a UE and/or load information of the serving cell of the UE. The information of the cell which interferes the serving cell of the UE may be generated from a measured result reported by the UE, and the measured result is obtained by performing a measurement on a neighbor cell of the UE. The first receiving unit 42 is adapted to receive scheduling control information sent by the centralized control node, where the scheduling control information is determined according to the scheduling parameter reported by the reporting unit 41. The scheduling unit 43 is adapted to schedule resources according to the scheduling control information received by the first receiving unit 42.

As shown in FIG. 5, a device 50 for managing interference includes a second receiving unit 51, a determining unit 52 and a sending unit 53. The second receiving unit 52 is adapted to receive a scheduling parameter reported by at least one AP. The scheduling parameter includes information of a cell which interferes a serving cell of a UE served by each AP of the at least one AP and/or load information of the serving cell of the UE. The information of the cell which interferes the serving cell of the UE may be generated from a measured result reported by the UE, and the measured result is obtained by performing a measurement on a neighbor cell of the UE. The determining unit 52 is adapted to determine scheduling control information according to the scheduling parameter received by the second receiving unit. The sending unit 53 is adapted to send the scheduling control information determined by the determining unit to the at least one AP. The at least one AP may schedule resources according to the scheduling control information.

The device 40 for managing interference may be an AP, such as a base station. The device 50 for managing interference may be a centralized control node, such as a LTE-Hi GW, a macro base station or other network nodes excepting LET-Hi AP.

The information of the cell which interferes the serving cell of the UE served by the device 40 for managing interference, transmitted between the devices 40 and 50 for managing interference, includes spectrum information of the cell and identification information of the cell. The load information of the serving cell includes spectrum information of the serving cell and time-frequency resource requirement information of the serving cell edge. The scheduling control information includes time-frequency resource information allocated to the serving cell edge. Further, the frequency spectrum information of the serving cell includes a bandwidth and frequency of the serving cell. The time-frequency resource requirement information of the serving cell edge includes information of dedicated time-frequency resource block required at the serving cell edge. The information of time-frequency resource block allocated to the serving cell edge includes information of dedicated time-frequency resource block allocated to the serving cell edge. To be specific, the information of dedicated time-frequency resource block includes information of time-frequency resource block for GBR service, information of time-frequency resource block for non-GBR service, or information of time-frequency resource block for PBR of GBR service.

If the second receiving unit 51 of the device 50 for managing interference receives the information of time-frequency resource block for GBR service required at the serving cell edge, and the information of time-frequency resource block for non-GBR service required at the serving cell edge, the scheduling control information determined by the determining unit 52 of the device 50 for managing interference may include the information of time-frequency resource block for GBR service allocated to the serving cell edge, and the information of time-frequency resource block for non-GBR service allocated to the serving cell edge. If the second receiving unit 51 of the device 50 for managing interference receives the information of time-frequency resource block for GBR service required by the serving cell edge, and the information of time-frequency resource block for PBR of non-GBR service required by the serving cell edge, the scheduling control information determined by the determining unit 52 of the device 50 for managing interference may include the information of time-frequency resource block for GBR service allocated to the serving cell edge, the information of time-frequency resource block for PBR of non-GBR service allocated to the serving cell edge, and the information of common time-frequency resource block, where the at least one AP uses a contention based mechanism to access the common time-frequency resource block to be used.

In addition, the scheduling control information may further include information of permissible transmission power. The scheduling parameter may further include a time period of interference, a user satisfaction feedback information of the serving cell edge and closing information of a closed AP.

Thus, by the method for managing interference according to the embodiment of the application, in the case that no direct connection interface is provided among APs, the centralized control node performs the centralized interference control among APs according to different loads of APs and different resource requirements of the edge of the cell, thereof implementing the semi-static interference coordination.

Those skilled in the art may understand that units and algorithm procedure in the cases described in the embodiments of the application may be implemented by an electronic hardware or a combination of computer software and electronic hardware. Whether the functions are performed by hardware or software depends on a specific application of technical solution and a design constraint. Those skilled in the art may implement the described functions for each specific application in different ways, which may not be considered as exceeding the scope of the application.

Those skilled in the art may understand clearly that the operation process of the system, device and unit described above may refer to the process corresponding to the method in the foregoing embodiments, which may be not be repeated herein.

In the embodiments of the application, it may be understood that the disclosed system, device and method may be implemented in other ways. For example, the embodiments of the device described above are only schematic, for instance, the unit is only divided according to logic functions, which may be divided in other ways in implementation. For instance, multiple units or components may be combined with or integrated into another system, or certain features may be ignored or not be implemented. In addition, the displayed or described coupling or direct coupling or communication may be an indirect coupling or communication between certain interfaces, devices or units, which may be electrical or mechanical coupling, etc.

The units described as separated components may be or not be separated physically. The components displayed as units may be or not be physical units, i.e., the components may be in one position or allocated to multiple network units, which may be selected partly or altogether as needed to realize the embodiments.

In addition, the functional units in the embodiments of the application may be integrated in one processing unit, or each unit is independent physically, or two or more than two units may be integrated in one unit.

If the functions are implemented in the manner of software functional units and sold or used as independent products, the software functional unit may be stored in a computer-readable storage medium. In view of this, the part of the technical solution of the application which makes contribution to the existing technology or the part of the technical solution may be implemented in the manner of software products, and the software products may be stored in a storage medium, including multiple instructions by which a computer equipment (personal computer, server or network equipment) may implement all of or part of the procedures of the method described in the embodiments of the application. In addition, the foregoing storage medium includes: various medium for storing program codes, such as USB flash, mobile hard disk, read-only memory (ROM), random access memory (RAM), diskette, optical disk.

The above description is only the specific implementation of the application, and the protection scope thereof is not restricted herein. The variation or replacement within the technical scope made by those skilled in the art may fall into the protection scope of the application. Therefore, the protection scope of the application may be subject to the protection scope of the claims.

The invention claimed is:

1. A method for managing interference, comprising:
reporting, by a serving Long Term Evolution High Frequency Hotspot and indoor Access Point (LTE-Hi AP), a scheduling parameter to a centralized control node, wherein the scheduling parameter comprises information of a cell which interferes a serving cell of a user equipment and/or load information of the serving cell of the user equipment, wherein the information of the cell which interferes the serving cell of the user equipment is generated from a measured result reported by the user equipment, and the measured result is obtained by performing a measurement on a cell adjacent to the serving cell of the user equipment;
receiving, by the serving LTE-Hi AP, scheduling control information sent by the centralized control node, wherein the scheduling control information is determined according to the scheduling parameter; and
scheduling, by the serving LTE-Hi AP, resources according to the scheduling control information;
wherein the load information of the serving cell of the user equipment comprises spectrum information of the serving cell and time-frequency resource requirement information at a serving cell edge.

2. The method according to claim 1, wherein the information of the cell which interferes the serving cell of the user equipment comprises spectrum information of the cell which interferes the serving cell of the user equipment, and identification information of the cell which interferes the serving cell of the user equipment.

3. The method according to claim 1, wherein the spectrum information of the serving cell comprises a bandwidth of the serving cell, and a frequency of the serving cell, and
the time-frequency resource requirement information at the serving cell edge comprises information of dedicated time-frequency resource block required at the serving cell edge.

4. The method according to claim 1, wherein the scheduling control information comprises time-frequency resource information allocated to a serving cell edge,
wherein the time-frequency resource information allocated to the serving cell edge comprises information of dedicated time-frequency resource block allocated to the serving cell edge; and information of common time-frequency resource block allocated to the serving cell edge, wherein at least one access point uses a contention based mechanism to access the common time-frequency resource block.

5. The method according to claim 4,
wherein the information of dedicated time-frequency resource block comprises: information of time-frequency resource block for Guaranteed Bit Rate service and information of time-frequency resource block for non-Guaranteed Bit Rate services; or
wherein the information of dedicated time-frequency resource block comprises: information of time-frequency resource block for Guaranteed Bit Rate service and information of time-frequency resource block for Prioritized Bit Rate of non-Guaranteed Bit Rate service.

6. The method according to claim 1, wherein the scheduling control information further comprises permissible transmission power information.

7. The method according to claim 1, wherein the scheduling parameter further comprises a time period of interference or user satisfaction feedback information from the user equipment at a serving cell edge.

8. A method for managing interference, comprising:
receiving a scheduling parameter reported by at least one access point, wherein the scheduling parameter comprises information of a cell which interferes a serving cell of a user equipment served by the at least one access point and/or load information of the serving cell of the user equipment, and wherein the information of the cell which interferes the serving cell of the user equipment is generated from a measured result reported by the user equipment, and the measured result is obtained by performing a measurement on a cell adjacent to the serving cell of the user equipment;
determining scheduling control information according to the scheduling parameter; and
sending the scheduling control information to the at least one access point, wherein the at least one access point schedules resources according to the scheduling control information;
wherein the load information of the serving cell of the user equipment includes spectrum information of the serving cell and time-frequency resource requirement information of a serving cell edge.

9. The method according to claim 8, wherein the information of the cell which interferes the serving cell of the user equipment comprises spectrum information of the cell which interferes the serving cell of the user equipment, and identification information of the cell which interferes the serving cell of the user equipment.

10. The method according to claim 8, wherein the spectrum information of the serving cell comprises a bandwidth of the serving cell and a frequency of the serving cell, and
the time-frequency resource requirement information of the serving cell edge comprises information of dedicated time-frequency resource block required at the serving cell edge.

11. The method according to claim 8, wherein the scheduling control information comprises time-frequency resource information allocated to a serving cell edge,
wherein the time-frequency resource information allocated to the serving cell edge comprises information of dedicated time-frequency resource block allocated to the serving cell edge.

12. The method according to claim 11,
wherein the information of dedicated time-frequency resource block comprises: information of time-frequency resource block for Guaranteed Bit Rate service and information of time-frequency resource block for non-Guaranteed Bit Rate service; or wherein the information of dedicated time-frequency resource block comprises: information of time-frequency resource block for Guaranteed Bit Rate service and information of time-frequency resource block for Prioritized Bit Rate of non-Guaranteed Bit Rate service.

13. The method according to claim 12, wherein determining the scheduling control information according to the scheduling parameter comprises:

determining that the scheduling control information comprises the information of time-frequency resource block for Guaranteed Bit Rate service allocated to the serving cell edge and the information of time-frequency resource block for non-Guaranteed Bit Rate service allocated to the serving cell edge, in the case that the information of dedicated time-frequency resource block of the time-frequency resource requirement information of the serving cell edge comprises the information of time-frequency resource block for Guaranteed Bit Rate service and the information of time-frequency resource block for non-Guaranteed Bit Rate service;

determining that the scheduling control information comprises the information of time-frequency resource block for Guaranteed Bit Rate service allocated to the serving cell edge, the information of time-frequency resource block for Prioritized Bit Rate of non-Guaranteed Bit Rate service allocated to the serving cell edge, and information of common time-frequency resource block, in the case that the information of dedicated time-frequency resource block of the time-frequency resource requirement information of the serving cell edge comprises the information of time-frequency resource block for Guaranteed Bit Rate service and the information of time-frequency resource block for Prioritized Bit Rate of non-Guaranteed Bit Rate service, wherein the at least one access point uses a contention based mechanism to access the common time-frequency resource block.

14. The method according to claim 8, wherein the scheduling control information further comprises permissible transmission power information.

15. The method according to claim 8, wherein the scheduling parameter comprises at least one of a time period of interference, user satisfaction feedback information from the user equipment at a serving cell edge and closing information of a closed access point.

16. A device for managing interference, comprising:
a processor; and
a memory storing program instructions, which when executed by the processor, configure the processor to:
report a scheduling parameter to a centralized control node, wherein the scheduling parameter comprises information of a cell which interferes a serving cell of a user equipment and/or load information of the serving cell of the user equipment, and wherein the information of the cell which interferes the serving cell of the user equipment is generated from a measured result reported by the user equipment, and the measured result is obtained by performing a measurement on a cell adjacent to the serving cell of the user equipment;

scheduling control information sent by the centralized control node, wherein the scheduling control information is determined according to the scheduling parameter; and schedule resources according to the scheduling control information;

wherein the load information of the serving cell of the user equipment comprises spectrum information of the serving cell and time-frequency resource requirement information of a serving cell edge.

17. The device according to claim 16, wherein the information of the cell which interferes the serving cell of the user equipment comprises spectrum information of the cell which interferes the serving cell of the user equipment, and identification information of the cell which interferes the serving cell of the user equipment.

18. The device according to claim 16, wherein the spectrum information of the serving cell comprises a bandwidth of the serving cell and a frequency of the serving cell, and the time-frequency resource requirement information of the serving cell edge comprises information of dedicated time-frequency resource block required by the serving cell edge.

19. The device according to claim 16, wherein the scheduling control information comprises time-frequency resource information allocated to a serving cell edge, wherein the time-frequency resource information allocated to the serving cell edge comprises information of dedicated time-frequency resource block allocated to the serving cell edge; and information of common time-frequency resource block allocated to the serving cell edge, wherein at least one access point uses a contention based mechanism to access the common time-frequency resource block.

20. The device according to claim 19, wherein the information of dedicated time-frequency resource block comprises: information of time-frequency resource block for Guaranteed Bit Rate service and information of time-frequency resource block for non-Guaranteed Bit Rate service; or wherein the information of dedicated time-frequency resource block comprises: information of time-frequency resource block for Guaranteed Bit Rate service and information of time-frequency resource block for Prioritized Bit Rate of non-Guaranteed Bit Rate service.

21. The device according to claim 16, wherein the scheduling control information further comprises permissible transmission power information.

22. The device according to claim 16, wherein the scheduling parameter further comprises a time period of interference or user satisfaction feedback information from the user equipment at a serving cell edge.

* * * * *